United States Patent [19]

Brander

[11] 4,033,193

[45] July 5, 1977

[54] VIBRATORY DRIVE UNIT

[75] Inventor: James Edward Brander, Strathfield, Australia

[73] Assignee: International Combustion Australia Limited, Australia

[22] Filed: Feb. 28, 1975

[21] Appl. No.: 554,218

[30] Foreign Application Priority Data

Mar. 4, 1974 Australia .......................... 6795/74

[52] U.S. Cl. ........................................ 74/61; 74/87

[51] Int. Cl.[2] ........................................ F16H 33/00

[58] Field of Search ............... 192/105 A; 267/168; 74/61, 87

[56] References Cited

UNITED STATES PATENTS

| | | | |
|---|---|---|---|
| 2,089,870 | 8/1937 | Young | 192/105 B |
| 2,738,046 | 3/1956 | Kostenko | 192/105 A |
| 2,954,674 | 10/1960 | Kane | 192/105 A |
| 3,030,056 | 4/1962 | Rogers | 267/168 |
| 3,039,758 | 6/1962 | Gratzmuller | 267/168 |
| 3,637,174 | 1/1972 | Kuo | 267/168 |

*Primary Examiner*—Allan D. Herrmann
*Assistant Examiner*—Wesley S. Ratliff, Jr.
*Attorney, Agent, or Firm*—D. Paul Weaver

[57] ABSTRACT

An improved rotary vibrator unit of the type comprising a first member adapted to be mounted on a shaft for rotation thereon or therewith, a mass mounted on said first member and adapted to be moved under the influence of centrifugal force during rotation of both said members and said mass in a radial direction relative to the axis of rotation thereof to unbalance the unit and cause it to vibrate, said unit further including resilient means adapted to provide a first resistance to radial movement of said mass through a first range of angular motion of said unit and including means providing a second resistance in addition to said first resistance during a second range of angular motion whereby the resistance to radial movement of said mass has a non-linear characteristic over the full range of angular motion of said unit.

1 Claim, 3 Drawing Figures

| | |
|---|---|
| o-a | ECCENTRICITY CONSTANT .26" |
| a | MOVING WEIGHT CENTRIFUGAL FORCE EQUALS SPRING PRE-LOAD FORCE |
| a-b | ECCENTRICITY VARIES FROM .26" TO .65" |
| b | SECOND SPRING BECOMES ACTIVE |
| b-c | ECCENTRICITY VARIES FROM ·65" TO 1·50" |
| c-d | ECCENTRICITY CONSTANT 1·50" |

VIBRATORY DRIVE UNIT

This invention relates to a vibratory drive unit.

Vibratory drive units of the type to which this invention relates comprise a rotatable shaft having an unbalanced mass mounted thereon for radial movement with respect to the axis of rotation. This construction provides the shaft with a degree of imbalance resulting from the relative position of the mass with respect to the axis of rotation. A pair of springs positioned one at each side of the mass provide a degree of resistance to radial movement of the mass resulting from the centrifugal forces imparted thereto during rotational motion of the shaft. As a consequence of the linear spring rate obtained from springs usually employed, a linear increase in vibration amplitude with respect to the shaft speed cannot be achieved. The mass tends, in practice, to remain at its innermost position until a given rotational speed is reached and then to jump to its outermost position, permitting only two levels of vibrational amplitude to be obtained. Thus this type of equipment is defective in that it is not possible to utilize the intermediate frequencies of the range.

It is of course possible to adjust the maximum thrust of the unbalanced mass to change the frequency of the vibrations. Such adjustment, however, can only be made when the unit is stationary and involves the use of a skilled operator.

In the U.S. Pat. No. 3,342,075 by K. B. Lowe there is disclosed a vibratory device in which the vibrator is driven by a two speed motor. At the lower speed no vibrations are transmitted while at the high speed maximum displacement of a radially displaceable mass is achieved. Normally this arrangement does not readily lend itself to operation in the intermediate range of frequencies. By the use of switching arrangement, however, it is possible by switching the motor between its two speeds to operate the vibrator in a range other than maximum. Although relatively effective the Lowe device utilizes mechanisms and equipment which are relatively larger, more complicated and more expensive than is desirable.

The present invention in contrast provides a unit which includes means which function to impart a degree of non-linearity of the spring rate over the full range from zero to the maximum frequency thereby enabling adequate use to be made of the intermediate frequencies.

In one general form the invention is an improved vibratory drive unit comprising a support member adapted to be attached to a driven shaft, means for preventing relative rotation between said shaft and said support member, a mass mounted on said support member and adapted to provide said unit with a degree of imbalance resulting from its position relative to the axis of rotation of said unit, said mass being so adapted, arranged and disposed as to react to rotational movement of said unit to move radially outward with respect to the axis of rotation to increase the degree of imbalance of said unit, said unit further including resilient means normally urging said mass towards the axis of rotation, said resilient means having a non-linear characteristic of resistance to said radial movement of said mass.

A preferred form of the present invention will now be described by way of example with reference to the accompanying drawings of which:

Figure 1:
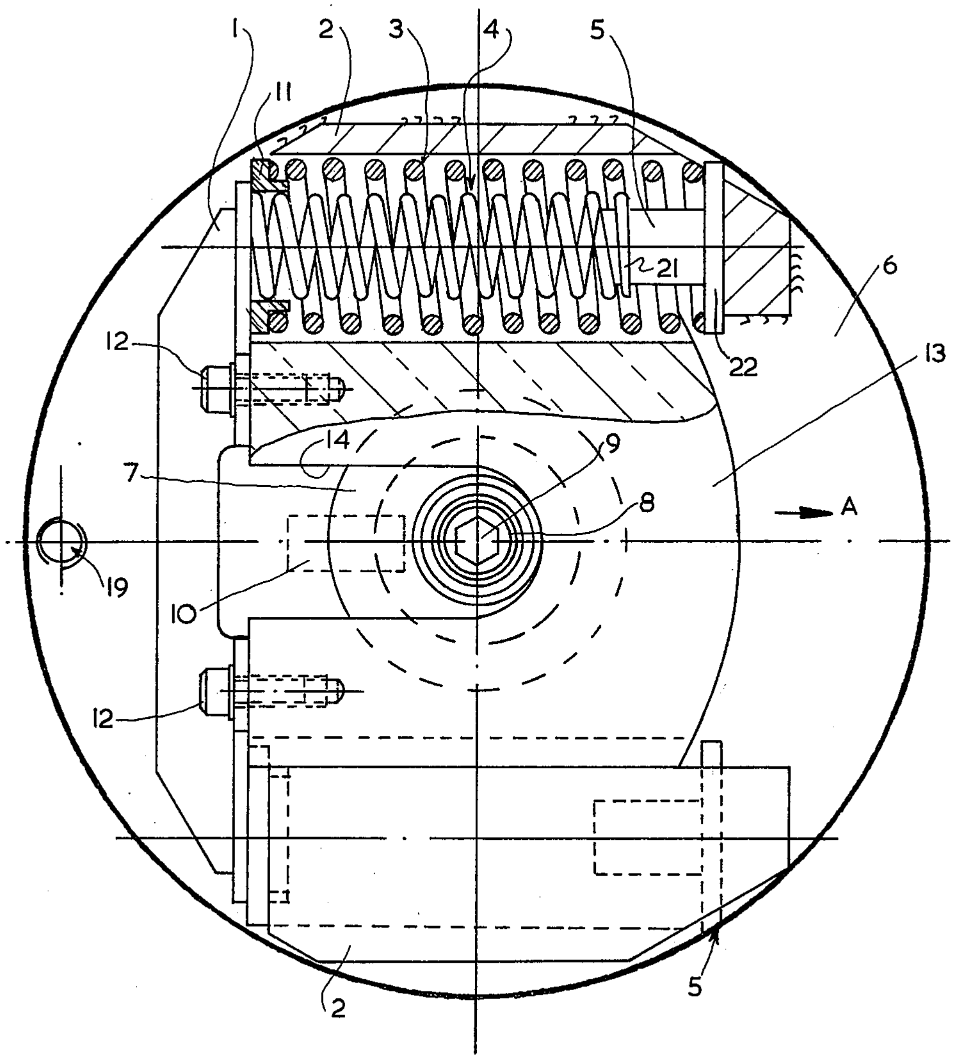
FIG. 1 is a part sectional end elevation of a typical vibratory drive unit according to the invention.

Referring now to the drawings, the preferred form of the invention comprises a support member 6 of circular or disc like configuration. The member 6 is provided with means 7 by which attachment to a shaft 8 may be achieved. A concentric bolt 9 retains the member 6 against axial movement while relative rotation between the shaft 8 and the member 6 is prevented by key 10.

Mounted on the member 6 at diametrically opposite positions are spring housing members 2. The housings 2 which are disposed in parallel relationship each include a spring mount 5 at one end. The opposite ends and adjacent sides of the housings 2 are open.

Mounted on the support member 6 between the housings 2 is an unbalanced mass 13 having an open slot 14 which permits location of the mass over the shaft and provides for radial movement thereof in the direction of the arrow A.

The open end of the slot 14 is bridged by a cross bar 1 which is secured to the mass by bolts 12 and at the opposing ends of which there are spring seats 11. The mass is urged in the opposite direction to the arrow A by spring 3 which is disposed in a partially compressed condition between support 5 and seat 11 in each housing 2. The function of this spring 3 is to provide a resistance to radial movement of the mass 13 resulting from rotation of the shaft 8.

Mounted in each housing within the spring 3 is a second spring 4, one end of which is located within the seat 11 and the other end 21 of which is located relatively loosely over the spigot of the support 5. Preferably the end of the second spring 4 is secured in the seat 11. The function of this additional spring in combination with spring 3 is to provide an overall non-linear spring rate.

Figure 3:
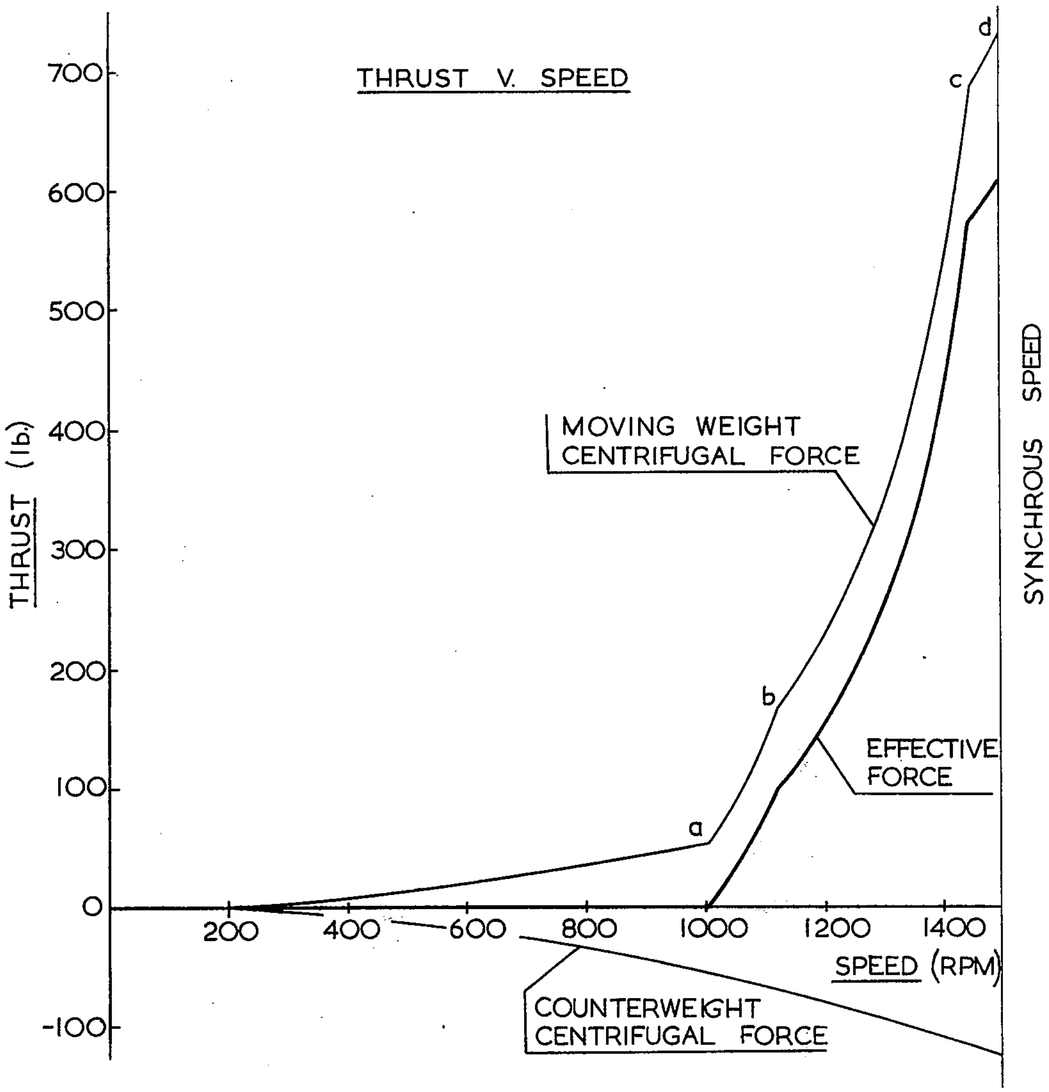
FIG. 3 is a graph representing a characteristic curve of vibrational thrust produced by the drive unit against shaft speed.

Referring now to the graph illustrated in FIG. 3 which shows the relationship of the thrust produced by the vibrational unit throughout a rotational speed range between 0 and 1,500 r.p.m., accordingly at 0 r.p.m. the movable mass has an eccentricity of, for example, 0.26 inches, the imbalance caused by this eccentricity being counterbalanced by a fixed mass secured to the support structure 6. In effect from start up of a drive source 20 upon which the unit is mounted and until the motor reaches a speed of 1,000 r.p.m., the movable mass experiences a centrifugal force but does not move owing to the partially compressed condition of spring 3. At point *a* on the graph, the centrifugal force acting on the moving mass equals the spring preload force and beyond point *a*, namely between 1,000 and 1,100 r.p.m. the mass moves from an eccentricity of 0.26 to 0.65 inch, compressing spring 3. At point *b* the mass 13 will have moved outwardly in the direction A of FIG. 1 sufficiently to permit end 21 of spring 4 to engage the flange 22 of support 5. At this point the second spring 4 becomes operative to provide an inflection point in the characteristic thrust curve. From 1,100 r.p.m. and up to 1,440 r.p.m., the mass increases in eccentricity from 0.65 to 1.5 inches. Above 1,440 r.p.m. and up to 1,500 r.p.m., which is the synchronous speed of the drive source 20, the eccentricity does not change.

The graph of FIG. 3 is illustrated in terms of a speed range from 0 to 1,500 r.p.m., which is preferred to suit the use of a standard slip characteristic induction motor as the drive source for the vibratory drive unit. Such an induction motor is preferred by reason, inter alia, of its availability and cost. Further, it should be noted that the centrifugal force acting on the moving mass 13 is proportional to the square of the rotational speed and accordingly the change in spring force is large in the speed range of 1,000 to 1,440 r.p.m., which latter speed is the speed at which the motor runs at maximum power output. Therefore, if a spring is used having an overall linear spring rate, then a large displacement of the mass will occur over a relatively small change in speed of the drive source in the speed range of 1,000 to 1,500 r.p.m. The mass at a transition speed, namely, the speed at which the mass moves from a stationary position relative to the axis of rotation to another position tends to move in an unstable manner and, on increasing the speed beyond the transition speed, the mass tends to jump from a position of zero vibrational thrust to a position of maximum vibrational thrust with no possibility of obtaining an intermediate position. To avoid jumping of the mass 13 in such an unstable manner, the additional spring 4 is introduced to effectively increase the change in speed which is required to cause the mass to move from one extreme position to another, without reducing the large change in amplitude and thrust of which the vibrational unit is capable in the speed range of 1,000 to 1,440 r.p.m. As illustrated in FIG. 3 the thrust, which is produced by the unit constructed according to the present invention, is proportional to a rough but useful approximation to the 4.60 power of the speed in the range of 1,100 to 1,440 r.p.m.

Figure 2:
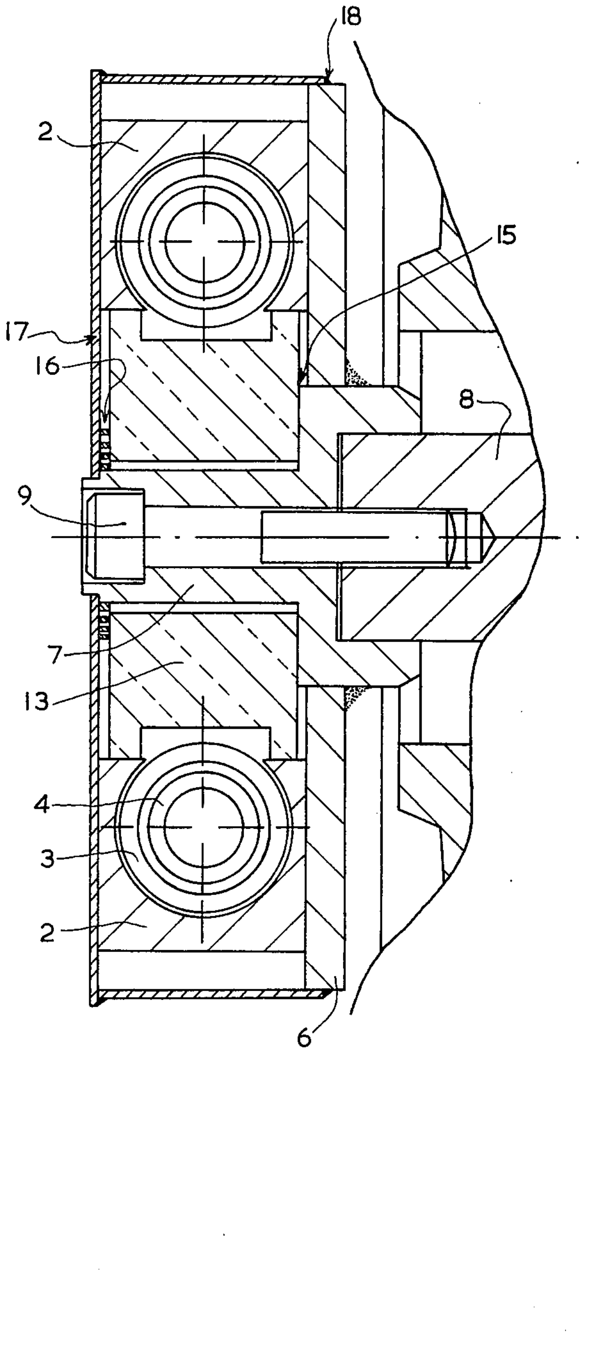
FIG. 2 is a part sectional fragmented side elevation of the vibratory drive unit shown mounted on a drive motor.

Transverse movement of the mass 13 is restricted by the insertion of shims 15 and 16 (FIG. 2) on each face of the mass. In addition to this the unit is enclosed by a housing 17 which is attached to the support 6 by suitable means such as weld 18.

The provision of a filler point 19 (FIG. 1) permits the unit to be filled with a suitable oil which functions to lubricate the working components of the unit and to provide a damping effect which is particularly desirable when the unit is operating at or near the transition speed. Thus, by suitable selection of the respective components comprised in the unit a unit may be selectively built for a particular function.

The invention enables a standard slip characteristic induction motor to be used to provide a large change in amplitude on a vibratory machine resulting from the large and controlled change of thrust.

It will be appreciated, of course, that the degree of imbalance imparted to the unit by the mass 13 may be varied by particular methods and material used in its construction; for example, the material from which the mass is constructed may be selected according to its weight per cubic inch. Alternatively, the mass may be manufactured in two or more parts of different weight factors according to requirements.

What I claim is:

1. Rotary vibrator drive unit comprising a disc-like support member secured to a driven shaft for rotation therewith, an unbalanced mass slidably secured to the support member for outward radial movement under the influence of centrifugal force, said unbalanced mass being slotted with the slot enclosing the driven shaft, a bridging crossbar across the open end of the slot, a pair of spring housings secured to the support member in diametrically opposed parallel relationship, a first helical coil spring within each housing held between the crossbar and a flange at the end of its spring housing remote from the crossbar, each said first helical coil spring when the drive unit is stationary being partially compressed and urging the unbalanced mass toward the position of minimum unbalance, a second helical coil spring within and coaxial with each first coil spring and being of shorter length than the first coil spring, each said second coil spring being secured at one end to the crossbar and with its other end slidable over a spigot on said flange so that each said second coil spring engages between the unbalanced mass and the support member only when the unbalanced mass has moved radially outward a predetermined distance, a housing surrounding the unbalanced mass and coil springs, and a damping oil filling the housing.

* * * * *